United States Patent [19]

Rowlands

[11] Patent Number: 6,037,451
[45] Date of Patent: Mar. 14, 2000

[54] METHOD OF DEGREASING BONE FOR GELATIN MANUFACTURE

[75] Inventor: Anne G. Rowlands, Honeoye Falls, N.Y.

[73] Assignee: Eastman Kodak Company, Rochester, N.Y.

[21] Appl. No.: 09/185,209

[22] Filed: Nov. 3, 1998

[51] Int. Cl.⁷ .............................. C07G 7/00; C08L 89/00; C09D 189/00
[52] U.S. Cl. .......................... 530/354; 530/355; 435/265; 435/273
[58] Field of Search ..................................... 530/354, 355; 435/265, 273

[56] References Cited

U.S. PATENT DOCUMENTS 4,220,724  9/1980  Berg et al. .............................. 435/273

Primary Examiner—Nathan M. Nutter
Attorney, Agent, or Firm—Carl F. Ruoff

[57] ABSTRACT

The present invention is a process for degreasing bone for the manufacture of gelatin. A lipase solution at a concentration of greater than 0.1 ppm is added to a collagen containing material and treated for a time sufficient to solubilize the fat contained in the collagen containing material to produce degreased collagen containing material with a fat content of less than 1 weight percent.

5 Claims, No Drawings

METHOD OF DEGREASING BONE FOR GELATIN MANUFACTURE

CROSS REFERENCE TO RELATED APPLICATIONS

This application relates to commonly assigned application Ser. No. 09/186,443 and now U.S. Pat. No. 5,919,906 filed simultaneously herewith. This application relates to commonly assigned copending application Ser. No. 09/185,491, filed simultaneously herewith. This application relates to commonly assigned copending application Ser. No. 09/185,440, filed simultaneously herewith.

FIELD OF THE INVENTION

The present invention relates to the production of gelatin. More, particularly the present invention provides a method of degreasing bone from which high quality gelatin can be extracted.

BACKGROUND OF THE INVENTION

Rendered bone contains varying amounts of fat or grease depending on the efficiency of the rendering process at removing tallow from the bone. Multiple sourcing of rendered bone results in a wide range of fat content in the starting bone material for gelatin manufacture. Fat contained in rendered bone is an impurity in photographic gelatin that must be removed during the gelatin manufacturing process. It is known that the fat content of bone directly effects photographic gelatin yield. Typically photographic gelatin yields are defined by the amount of gelatin produced with an absorbance at 420 nm of less than 0.150. Analysis of production data comparing low fat and high fat bone suppliers suggests that each 1% decrease in fat content of the starting bone results in a 0.4% increase in photographic gelatin yield.

Currently, fat or grease is removed at various stages throughout the gelatin manufacturing process with varying levels of efficiency. Typically, cattle bone used in the manufacture of high grade gelatin, is cleaned of its fats, grease, blood and bone marrow by hot water washing. The bone is then demineralized in a liquid/solid extraction/reaction process using an acid solution. Removal of minerals from the bone particles in the demineraliztion process yields particles of a material known as ossein. The gelatin is extracted from the ossein.

Following washing and acidulation, and sometimes liming of the cattle bone, the fat content ranges from 4–6% of the organic content of ossein. Although fat is reduced through each step of the gelatin manufacturing process, fat remaining in the final gelatin product is directly impacted by the fat content of the starting bone. Due to the inability to reproducibly reduce fat content of the bone to a low level, photographic gelatin yield is reduced. Ideally, to minimize photographic gelatin yield losses due to fat impurities a process for producing a uniform low fat rendered bone is required. This invention describes a single purification step specifically designed and optimized for fat removal from rendered bone.

SUMMARY OF THE INVENTION

The present invention is a process for degreasing bone for the manufacture of gelatin. A lipase solution at a concentration of greater than 0.1 ppm is added to a collagen containing material and treated for a time sufficient to solubilize the fat contained in the collagen containing material to produce degreased collagen containing material with a fat content of less than 1 weight percent.

DETAILED DESCRIPTION OF THE INVENTION

The present invention is a process for degreasing bone for the manufacture of gelatin. A lipase solution at a concentration of at least 0.1 ppm is added to a collagen containing material. The collagen containing material is treated for a time sufficient to solubilize fat contained in the collagen containing material to produce degreased collagen containing material with a fat content of less than 1 weight percent.

Collagen containing material is that requires degreasing is obtained from animal bone and hide. Bone is defined as bone material that is essentially freed of attached meat and may contain cartilage, connective tissue, marrow, etc. Bones are obtained from beef, chicken, pork and fish. Preferably cow bones are used as a starting material.

Lipases are biological catalysts or enzymes found in living organisms. More specifically, lipases are a group of carboxylesterases, which preferentially hydrolyze emulsified neutral fats to fatty acids and glycerol or monoacylglycerols. The commercially available lipases described herein were produced via biofermentation of genetically modified strains of bacteria

EXAMPLES

Lipase effectiveness on grease removal from bone was determined by providing, ground cow bone incubated with 0.5–5% w/w lipase for varied amounts of time at temperatures ranging from 17–70 ° C. The pH was varied from 4.0 to 12.0. Following incubation the enzyme solution containing released fatty acids was decanted from the ground bone. Fat still present in the ground bone was detected by analysis of the fatty acid content of the treated ground bone. Briefly, ground bone (0.2 grams in 50ml water) was boiled for 15 minutes and allowed to cool to room temperature. Following pH adjustment to pH 45 with weak acetic acid the sample was again boiled for 15 minutes. Subsequently the sample was incubated with 0.5% v/w alkaline protease for 30 minutes at 40 ° C., pH 10. This procedure degrades the bone to peptides and allows determination of total fat content as measured by the fatty acid components of the grease.

Fatty acid content in a degraded gelatin sample matrix was determined by Gas Chromatography of fatty acid methyl ester derivatives. The fat containing degraded gelatin sample matrix was boiled with NaOH and cooled prior to extraction with petroleum ether at a low pH. The ether extracted fatty acids were converted to their methyl ester derivatives using Borontrifluoride/methanol. The derivatives were extracted into n-hexane and chromatographed on a 30 m×0.32 mm, 0.25 micron loading DB-5 capillary column. The concentration of each fatty acid was calculated from the computer integrated peaks using the response factor of an internal standard.

| LIPASES: | |
|---|---|
| Lipase G-1000 | Genencor International |
| Lipomax CXT Enzyme | Genencor International |
| Lipase BC-100 | Genencor International |
| Lipolase | Novo Nordisk |

EXAMPLE 1:

Reduction of the fat content of bone from 3.35% to 0.60% following treatment with 1% Novo Lipolase:

|  | ppm | | | | |
| --- | --- | --- | --- | --- | --- |
|  | Myristic | Palmitic | Oleic | Stearic | Total |
| Bone in H$_2$O | 220 | 1836 | 3132 | 1524 | 6712 |
| 1% Novo Lipolase: | | | | | |
| RT 1 hr. | 0 | 643 | 1006 | 674 | 2023 |
| RT 5 hr. | 0 | 437 | 694 | 468 | 1599 |
| RT 8 hr. | 0 | 364 | 563 | 355 | 1282 |
| 50° C. 1 hr. | 0 | 338 | 514 | 355 | 1207 |
| 50° C. 5 hr. | 0 | 214 | 301 | 232 | 747 |
| 50° C. 8 hr. | 0 | 455 | 753 | 498 | 1706 |

In this Example, ground bone was incubated with 1% (volume) Novo Lipase for 1, 5 or 8 hours at room temperature and 50 ° C. Fat content of the bone following removal of the lipase soaks was compared to the untreated bone in water. The results above show that I hour lipase treatment at either temperature was sufficient for fat removal.

EXAMPLE 2:

Dramatic reduction in the fat content of bone from a very high (28%) fat, bone sample following treatment with Genencore Lipase G1000 or Lipomax. In this study Lipase G-1000 was incubated with ground bone for 5 hours at pH 7.0, 45 C., and Lipomax was incubated with ground bone for 30 minutes at pH 9.0, 55 C. Fat content of the bone following these treatments is shown below.

|  | ppm | | | | |
| --- | --- | --- | --- | --- | --- |
|  | Myristic | Palmitic | Oleic | Stearic | total |
| No Enzyme | 1517 | 15502 | 26748 | 12588 | 56355 |
| 1.0% Lipase | 160 | 1171 | 1730 | 949 | 4010 |
| 1.0% Lipomax | 0 | 895 | 174 | 1623 | 2692 |

Both Lipase G- 1000 and Lipomax reduced the fat content of the starting bone to less than 0.5 weight %, although the conditions for optimum reaction (temperature, time, pH and enzyme concentration) are dependent on the lipase being used.

EXAMPLE 3:

In this example varying concentrations of Lipase BC-100 were incubated with cow bone (3/16" to >3/8") for 26 hours at pH 7.0, 20.5 C. Following enzyme incubation the enzyme solution was decanted from the bone and the remaining fat content of the bone was determined. Fat content of bone following Lipase BC-100 treatment is shown below. These results show that a water wash does not remove fat from the starting bone.

|  | PPM | | | | |
| --- | --- | --- | --- | --- | --- |
|  | Myristic | Palmitic | Oleic | Stearic | Total |
| Starting Bone | 362 | 2592 | 4008 | 1902 | 8864 |
| Water Wash | 352 | 2636 | 4833 | 1971 | 9793 |
| 0.001 ppm Lipase BC-100 | 371 | 3003 | 4777 | 2200 | 10350 |
| 0.01 ppm Lipase BC-100 | 272 | 2412 | 3969 | 1776 | 8429 |
| 0.1 ppm Lipase BC-100 | 334 | 2850 | 4988 | 2123 | 10294 |
| 1 ppm Lipase BC-100 | 187 | 1500 | 2354 | 1184 | 5255 |
| 30 ppm Lipase BC-100 | 0 | 510 | 597 | 400 | 1506 |
| 143 ppm Lipase BC-100 | 0 | 455 | 671 | 370 | 1495 |

The results above show that for the particular lipase tested, greater than 0.1 ppm (weight) concentration is required to reduce fat content of the bone. The minimum level of lipase depends on the enzyme used.

The invention has been described in detail with particular reference to certain preferred embodiments thereof, but it will be understood that variations and modifications can be effected within the spirit and scope of the invention.

What is claimed is:

1. A process for degreasing collagen containing material for the manufacture of gelatin comprising:

providing a collagen containing material;

adding a lipase solution at a concentration of greater than 0.1 ppm to the collagen containing material for a time sufficient to solubilize fat contained in the collagen containing material to produce degreased collagen containing material with a fat content of less than 1 weight percent.

2. The process of claim 1 wherein the lipase solution has a pH of from 4 to 12.

3. The process of claim 1 wherein the lipase solution is at a temperature of from 17 to 70 ° C.

4. The process of claim 1 wherein the collagen containing material comprises animal bones or hides.

5. The process of claim 1 wherein the time sufficent to solubilize fat is from 1 to 8 hours.

* * * * *